US012766599B2

(12) United States Patent
Calefati et al.

(10) Patent No.: US 12,766,599 B2
(45) Date of Patent: Oct. 20, 2026

(54) POWDER REGULATING DEVICE

(71) Applicant: Morphica S.R.L., Monopoli (IT)

(72) Inventors: Sante Calefati, Monopoli (IT); Nicolai Valenti, Monopoli (IT)

(73) Assignee: MORPHICA S.R.L., Monopoli (IT)

( * ) Notice: Subject to any disclaimer, the term of this patent is extended or adjusted under 35 U.S.C. 154(b) by 383 days.

(21) Appl. No.: 18/574,118

(22) PCT Filed: May 31, 2022

(86) PCT No.: PCT/IT2022/050152
§ 371 (c)(1),
(2) Date: Dec. 26, 2023

(87) PCT Pub. No.: WO2023/007518
PCT Pub. Date: Feb. 2, 2023

(65) Prior Publication Data
US 2024/0316648 A1 Sep. 26, 2024

(30) Foreign Application Priority Data
Jul. 28, 2021 (IT) ........................ 102021000020180

(51) Int. Cl.
*B22F 12/55* (2021.01)
*B22F 10/28* (2021.01)
(Continued)

(52) U.S. Cl.
CPC .............. *B22F 12/55* (2021.01); *B22F 10/28* (2021.01); *B22F 10/73* (2021.01); *B22F 12/41* (2021.01);
(Continued)

(58) Field of Classification Search
CPC ........ B29C 64/329; B22F 12/52; B22F 12/55; B22F 12/57
See application file for complete search history.

(56) References Cited

U.S. PATENT DOCUMENTS 7,871,551 B2 * 1/2011 Wallgren ................ B22F 12/41
425/375
8,308,466 B2 * 11/2012 Ackelid ................ B29C 64/153
425/375
(Continued)

FOREIGN PATENT DOCUMENTS

CN 202317020 U * 7/2012
CN 105172149 A 12/2015
(Continued)

OTHER PUBLICATIONS

Machine translation of Deng et al. (CN 105172149 A) (Year: 2019).*
Sep. 9, 2022, International Search Report of PCTIT2022050152.

*Primary Examiner* — Benjamin A Schiffman
(74) *Attorney, Agent, or Firm* — Whitestone Law, PLLC

(57) ABSTRACT

Some embodiments relate to a powder regulating device for additive manufacturing is described, designed to create three-dimensional objects starting from a digital 3D model by sintering the layers with the use of a dust collection and arrangement system, a laser source, an optical system and mechanical means suitable for depositing a powder bed of materials such as metals, plastics, resins, polymers and composite components on a work surface.

9 Claims, 7 Drawing Sheets

(51) Int. Cl.

| | |
|---|---|
| ***B22F 10/73*** | (2021.01) |
| ***B22F 12/41*** | (2021.01) |
| ***B22F 12/49*** | (2021.01) |
| ***B22F 12/52*** | (2021.01) |
| ***B22F 12/57*** | (2021.01) |
| ***B22F 12/67*** | (2021.01) |
| ***B29C 64/153*** | (2017.01) |
| ***B29C 64/214*** | (2017.01) |
| ***B29C 64/232*** | (2017.01) |
| ***B29C 64/268*** | (2017.01) |
| ***B29C 64/329*** | (2017.01) |
| ***B29C 64/336*** | (2017.01) |
| ***B29C 64/343*** | (2017.01) |
| ***B33Y 10/00*** | (2015.01) |
| ***B33Y 30/00*** | (2015.01) |
| ***B33Y 40/00*** | (2020.01) |
| *B22F 3/00* | (2021.01) |
| *B22F 12/00* | (2021.01) |

(52) U.S. Cl.

CPC .............. *B22F 12/49* (2021.01); *B22F 12/52* (2021.01); *B22F 12/57* (2021.01); *B22F 12/67* (2021.01); *B29C 64/153* (2017.08); *B29C 64/214* (2017.08); *B29C 64/232* (2017.08); *B29C 64/268* (2017.08); *B29C 64/329* (2017.08); *B29C 64/336* (2017.08); *B29C 64/343* (2017.08); *B33Y 10/00* (2014.12); *B33Y 30/00* (2014.12); *B33Y 40/00* (2014.12); *B22F 3/004* (2013.01); *B22F 12/222* (2021.01); *B22F 2999/00* (2013.01); *Y02P 10/25* (2015.11)

(56) References Cited

U.S. PATENT DOCUMENTS

| | | | | |
|---|---|---|---|---|
| 9,415,443 | B2 * | 8/2016 | Ljungblad | ............... B22F 10/28 |
| 9,561,542 | B2 * | 2/2017 | Ackelid | ................. B33Y 40/10 |
| 10,399,179 | B2 * | 9/2019 | Harding | ............... B23K 26/342 |
| 2016/0136730 | A1 | 5/2016 | Mcmurtry et al. | |
| 2019/0352730 | A1 * | 11/2019 | Chiba | ................ B23K 15/0086 |
| 2020/0230882 | A1 * | 7/2020 | Eideloth | ............... B29C 64/255 |
| 2023/0391008 | A1 * | 12/2023 | Bonilla | ................. B29C 64/343 |
| 2024/0227014 | A1 * | 7/2024 | Calefati | .................. B22F 10/28 |

FOREIGN PATENT DOCUMENTS

| | | | | |
|---|---|---|---|---|
| CN | 105689716 A | | 6/2016 | |
| CN | 111497235 A | * | 8/2020 | ........... B29C 64/393 |
| EP | 2398611 A1 | | 12/2011 | |
| EP | 3682978 A1 | | 7/2020 | |

* cited by examiner

POWDER REGULATING DEVICE

CROSS-REFERENCE TO RELATED APPLICATIONS

This application is a national phase filing under 35 C.F.R. § 371 of and claims priority to PCT Patent Application No. PCT/IT2022/050152, filed on May 31, 2022, which claims the priority benefit under 35 U.S.C. § 119 of Italian Application No. 102021000020180, filed on, Jul. 28, 2021.

TECHNICAL FIELD

The present invention refers to a powder regulating device, in accordance with the preamble of claim 1. In particular, it refers to an innovative powder regulating device for additive manufacturing with powder bed fusion technology or with a bed of metal powder and/or resin material and/or polymeric.

BACKGROUND

Additive manufacturing (AM) is a set of industrial additive manufacturing processes to manufacture objects starting from digital models, as opposed to traditional subtractive techniques, such as for example machining by chip removal, cutting and drilling, which start from a block of material from which the shavings are mechanically removed; starting from computerized 3D models of a specific object, it is possible to carry out a subdivision into layers with the aid of a software integrated in the control system of the machine, or from online services, in order to obtain a scheme of layers or resulting layers that will be processed by a machine tool for the sintering, or deposition, process of different types of materials such as metals, plastics, resins, polymers and composite components.

SUMMARY

The main feature of this technology is that it is a production process that allows the creation of components with a geometry very close to that of the final component, as required by the project drawing. In the AM family, some technologies with different characteristics can be identified, such as the selective melting/sintering of a powder bed of materials such as metals, plastics, resins, polymers and composite components using a laser beam (Selective Laser Beam Melting—SLBM or Selective Laser Beam Sintering—SLBS) or also known as Powder Bed Fusion or PBF, binder jet casting, fused filament fabrication, stereolithography (SLA), in which dust from materials such as metals, plastic resins, polymers and composite components is deposited on a construction support before the interaction with the energy source, and the deposition of metal by laser beam (Laser Beam Metal Deposition—LBMD), in which the powder is sprayed on the support with the aid of one or more nozzles and at the same time is hit by the energy beam, and Selective Electron Beam Melting (SEBM).

In the powder bed technology of materials such as metals, plastics, resins, polymers and composite components or PBF, a laser beam, by means of a lens system and a scanner, is used as a source of high power density heat, necessary to lead to melting the powders of materials such as metals, plastics, resins, polymers and composite components only in certain predetermined areas, in which compact material must be obtained for the construction of the three-dimensional component. In particular, the powder contained in special hoppers is sent with a feeding system on the construction surface, in particular in front of the doctor blade or the recoater, which distributes it in a layer generally 20-60 μm thick, which will then be selectively hit by the beam laser according to the desired geometry. The substrate together with the bed of powder that is not hit by the laser beam provides mechanical support for the piece under construction: in fact, after the first layer has been completed, the platform is lowered, new powder is distributed and the layers that are already deposited must not move. The build plate also has the important task of dissipating heat that is created during the process, and in some cases it can even be heated, in order to lower the thermal gradient with the piece under construction, which could lead to the formation of high voltages, residuals and consequent deformation of the component. In order to make the most of the work area, it is also possible to build multiple pieces within the same powder bed. Usually the powder bed process is carried out in a chamber into which inert gas is blown in order to prevent oxidation of the material. These characteristics have allowed access to the industrial market of powder bed technology, for the production of components in different sectors, from aerospace to medical, from automotive to jewelry. In particular, compared to traditional production technologies, it is possible to achieve very high levels of component customization, given the great flexibility of the powder bed technology.

The powder bed or PBF process is characterized by various factors that determine the final properties of the components produced, in terms of density, microstructure and mechanical properties; in particular, it depends on the radiation-matter interaction or on the absorption properties of the materials of the energy of electromagnetic radiation and on the temperature of the powder bed. The absorption properties of a material include parameters such as density, thermal conductivity, specific heat and emissivity, and vary with the temperature of the material itself, which in a powder bed fusion additive manufacturing technology, determines the material processing process.

The choice of process parameters such as laser power, laser scanning speed on the powder bed, shape of the laser beam and used material influence the structural and surface quality of the components produced and the productivity of the system, which becomes decisive for the use of this type of machinery in the industrial field, especially in sectors today covered by foundry and/or hot moulding and/or die casting, due also to the advantages such as high spatial resolution, capillary process control and the ability to carry out a pre-processing of the powder bed and post-processing of the freshly melted material.

The fusion process by means of the laser source takes place inside a working chamber under an atmosphere of an inert gas (for example nitrogen, argon, etc.), inside which there are some handling devices that allow controlling the adduction of the powder, and therefore guaranteeing the realization of the component, the aspiration of fumes deriving from the selective melting process and the introduction of support gas to the production process.

Many powder regulating devices for additive manufacturing technology are known in the art, such as document EP3718745 relating to a system that ensures a continuous supply of the construction material in order to avoid interruptions in the production process in the event that the storage of the construction material of the respective supply devices are empty and must be exchanged and/or reloaded, or document EP3693103, relating to a device for feeding the powder which makes it fall by rotating the roller provided with a plurality of suitable grooves to dose the necessary amount of powder, and also document EP3695922 concerning a powder feeding device and a 3D object production device capable of supplying powder in a desired quantity.

The main disadvantage of the known art concerns powder regulating devices in which the powder loading system is mainly from the bottom and the quantity of powder to be "dosed" for the production process is not very accurate, since the "dose factor" is managed in pneumatically causing a considerable accumulation of residual dust to be recycled for the following production processes; moreover, the top loading systems known in the art make use of a roller system for transporting the powders towards the doctor blade, making also in this case the distribution of the powders not very accurate and limited to a "discrete" dosage depending on the grooves of the transport system.

Object of the present invention is solving the aforementioned prior art problems by means of a powder regulating device (100), through a mechanical and technological solution with a simple system free from imprecise dosing procedures, designed to convey the quantity of powder necessary for the layer inherent to the processing to be carried out by laser technology in a predetermined area of a work surface; another object is providing a mechanical solution capable of minimizing the quantity of powder to be recycled by means of a surgical dosage dependent on the additive manufacturing process.

The above and other objects and advantages of the invention, as will emerge from the following description, are achieved with a powder regulating device such as that described in claim 1. Preferred embodiments and non-trivial variants of the present invention are the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

BRIEF DESCRIPTION OF DRAWINGS

The present invention will be better described by some preferred embodiments thereof, provided by way of non-limiting example, with reference to the attached drawings, in which.

DETAILED DESCRIPTION OF EMBODIMENTS

Figure 1:
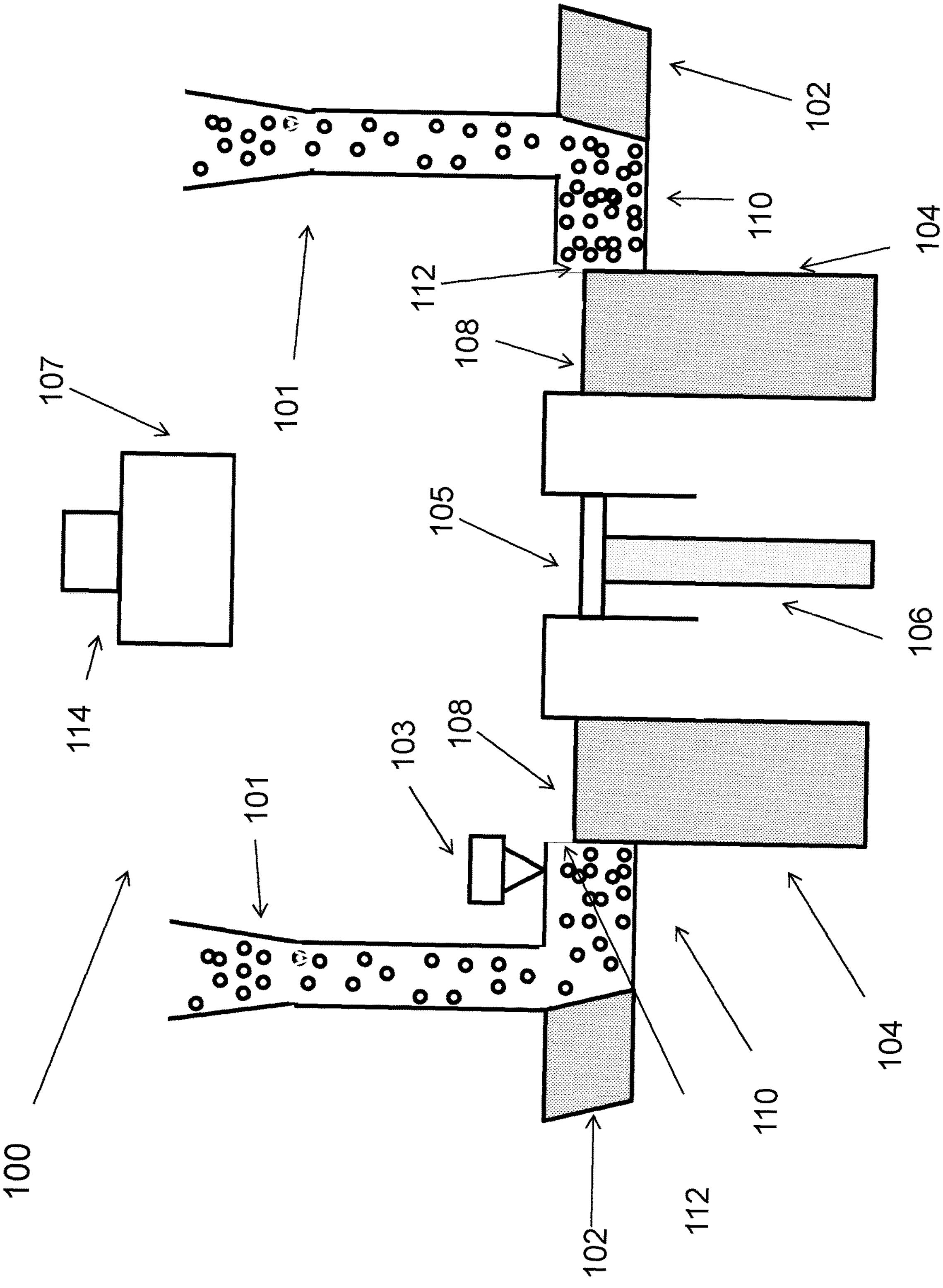
FIG. 1 shows the powder regulating device (100) according to the present invention.

The powder regulating device (100) for additive manufacturing is designed to create three-dimensional objects starting from a digital 3D model by sintering the layers with the use of a dust collection and arrangement system, a laser source, an optical system and mechanical means suitable for depositing a bed of dust of materials such as metals, plastics, resins, polymers and composite components on a work surface; it consists of two ducts (101), specular to each other, designed to collect and convey the particles of metal dust (109) and/or resin and/or polymeric material in two collection areas (110), specular to each other, called conduits (101) being connected to the upper surface of a laser and two-piston operating machine (102), a working plate (105), designed to house a bed of metal powder (109) and/or resin and/or polymeric material, operatively connected to a piston (106) and an optical system (107) designed to convey and focus the beam of electromagnetic radiation (111) emitted by a laser source (114) in a predetermined area of said working plate (105) said optical system being connected to the upper surface of a laser operating machine, as can be seen from FIG. 1.

The powder regulating device (100) for additive manufacturing is provided with two ducts (101) with an inverted "L" and "L" shaped vertical geometry, through which it is possible to introduce the metal powder (109) in a controlled manner and/or resin and/or polymeric material with vertical drop, are made of metallic material, and are positioned at the ends of said working plate (105), as can be seen from FIG. 1.

Figure 2:
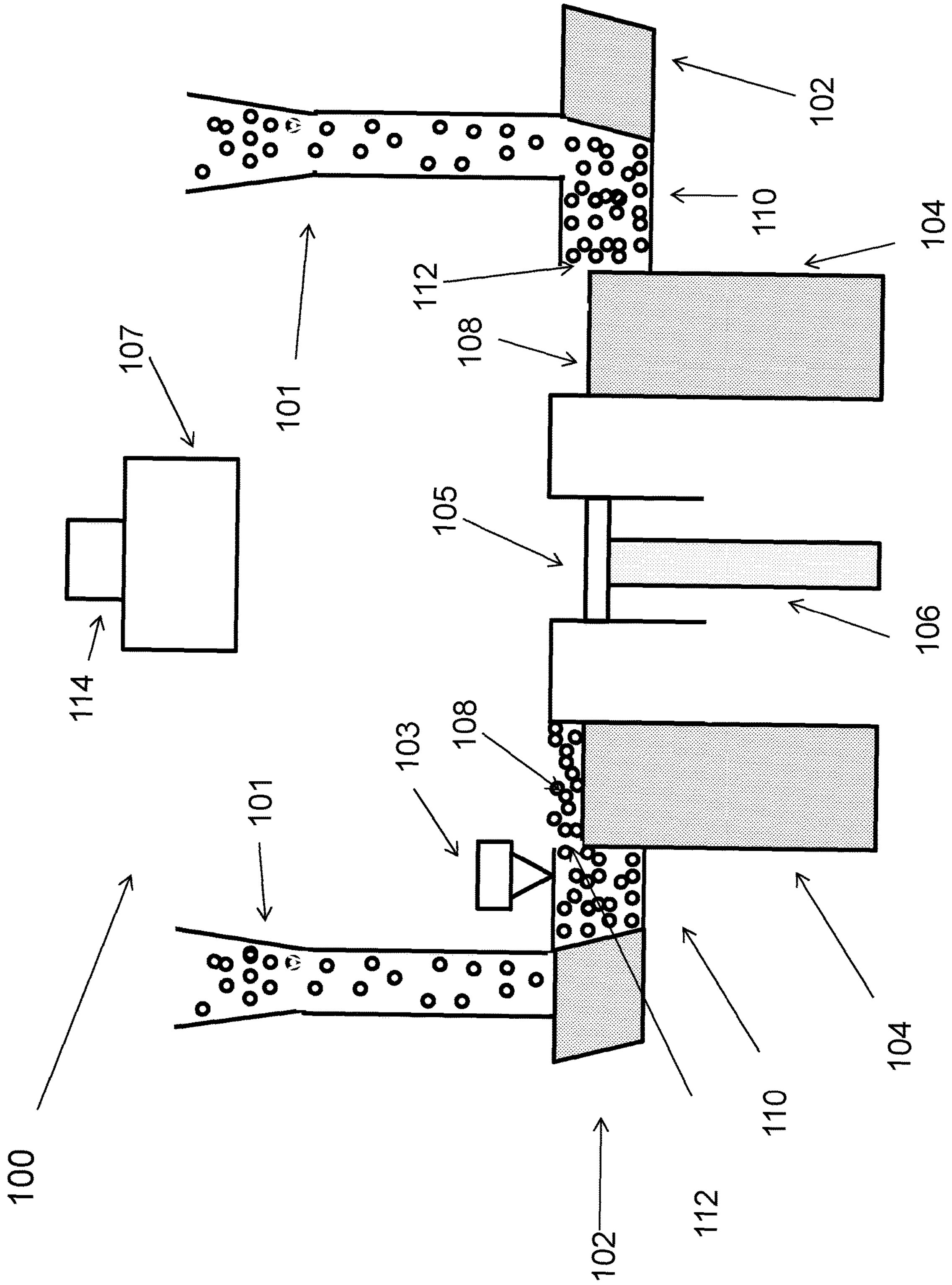
FIG. 2 shows the powder regulating device (100) with the actuation of the piston (102) according to the present invention.

Advantageously, said ducts (101) are made with two openings at the right and left ends of the "L" and inverted "L" shape, said openings (112) necessary to facilitate the exit and positioning of said dust particles (109) metal and/or resin and/or polymeric material in said collection areas (108), as can be seen from FIG. 2.

Figure 3:
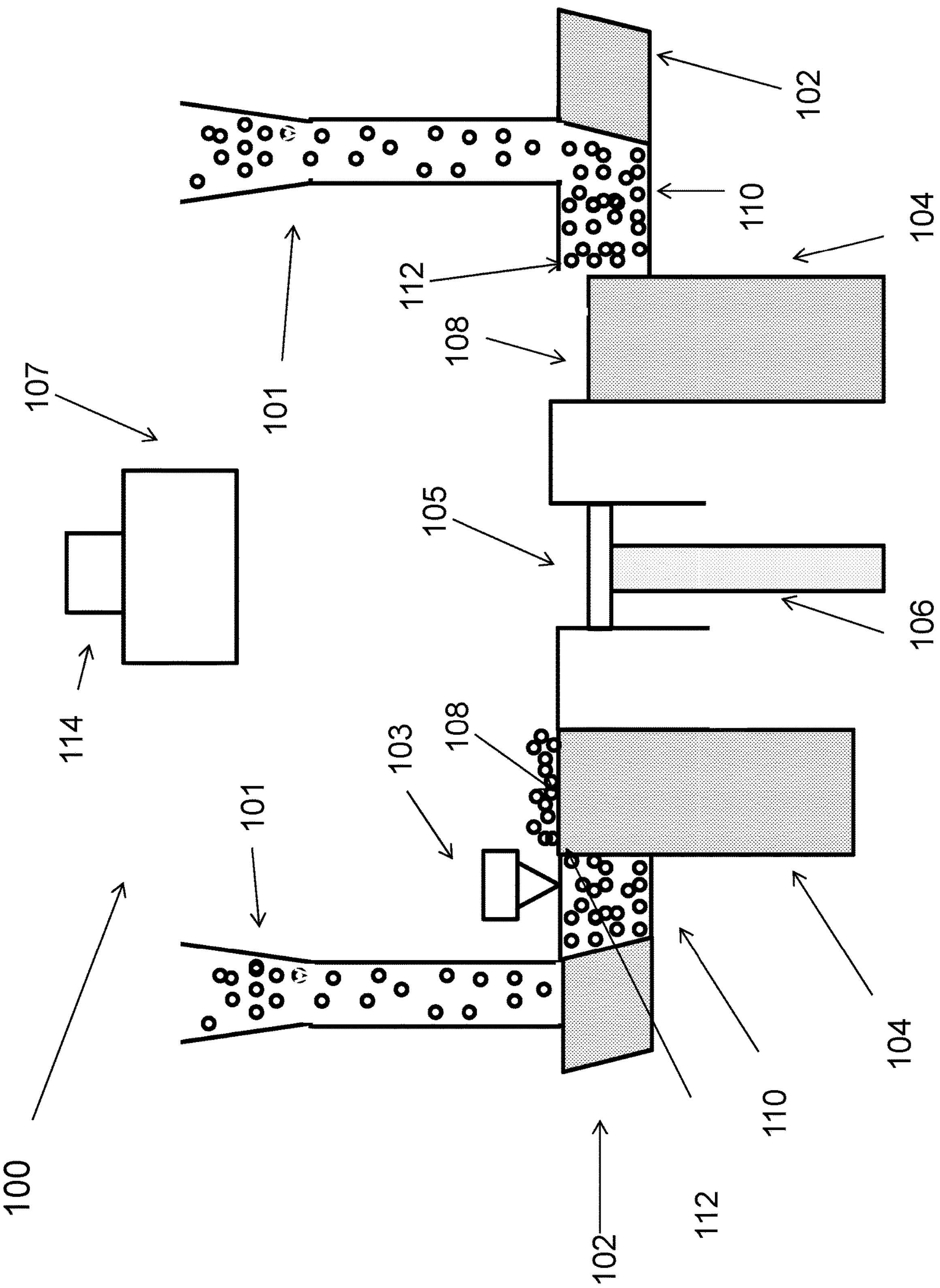
FIG. 3 shows the powder regulating device (100) with the actuation of the piston (104) according to the present invention.

Furthermore, said ducts (101) are provided at the left and right ends of the shape of an inverted "L" and "L" with two pistons (102) necessary to introduce the predetermined quantity of said particles of metallic and/or material powder (109) resin and/or polymeric in said collection areas (110) ensuring a lower waste of dust and consequently a controlled recycling process, said pistons (102) operatively connected to the ends of said ducts (101) of a machine tool, as can be seen from FIG. 3.

The powder regulating device (100) for additive manufacturing is provided with two pistons (104) operatively connected to the right and left ends of the lower part of said working plate (105) in a machine tool which, through a vertical movement action, position said particles of metal powder (109) and/or resin and/or polymeric material in said collection areas (108), as can be seen from FIG. 3. Furthermore, the dust regulating device (100) for additive manufacturing is equipped with a doctor blade or recoater (103) designed for laying the bed of metal powder particles (109) and/or resin and/or polymeric material in said working plate (105) for additive manufacturing applications, said doctor blade or recoater (104) capable of spreading the powder bed to the left and right of said working plate (105), said doctor blade or recoater (104) operatively connected to said working plate or (105) by means of handling means such as for example actuators and/or sliding rails in a machine tool, as can be seen from FIGS. 3, 4 and 7.

The powder regulating device (100) for additive manufacturing is provided with a working plate (105) arranged in a predetermined position based on the quantity of metal powder particles (109) and/or resin and/or polymeric material to be spread in said working plate (105) necessary for additive manufacturing applications, said working plate (105) operatively connected to a piston (108) necessary to carry out a vertical downward movement after the solidification of the layer (113) following the action of said laser (114) for additive manufacturing applications.

Figure 4:
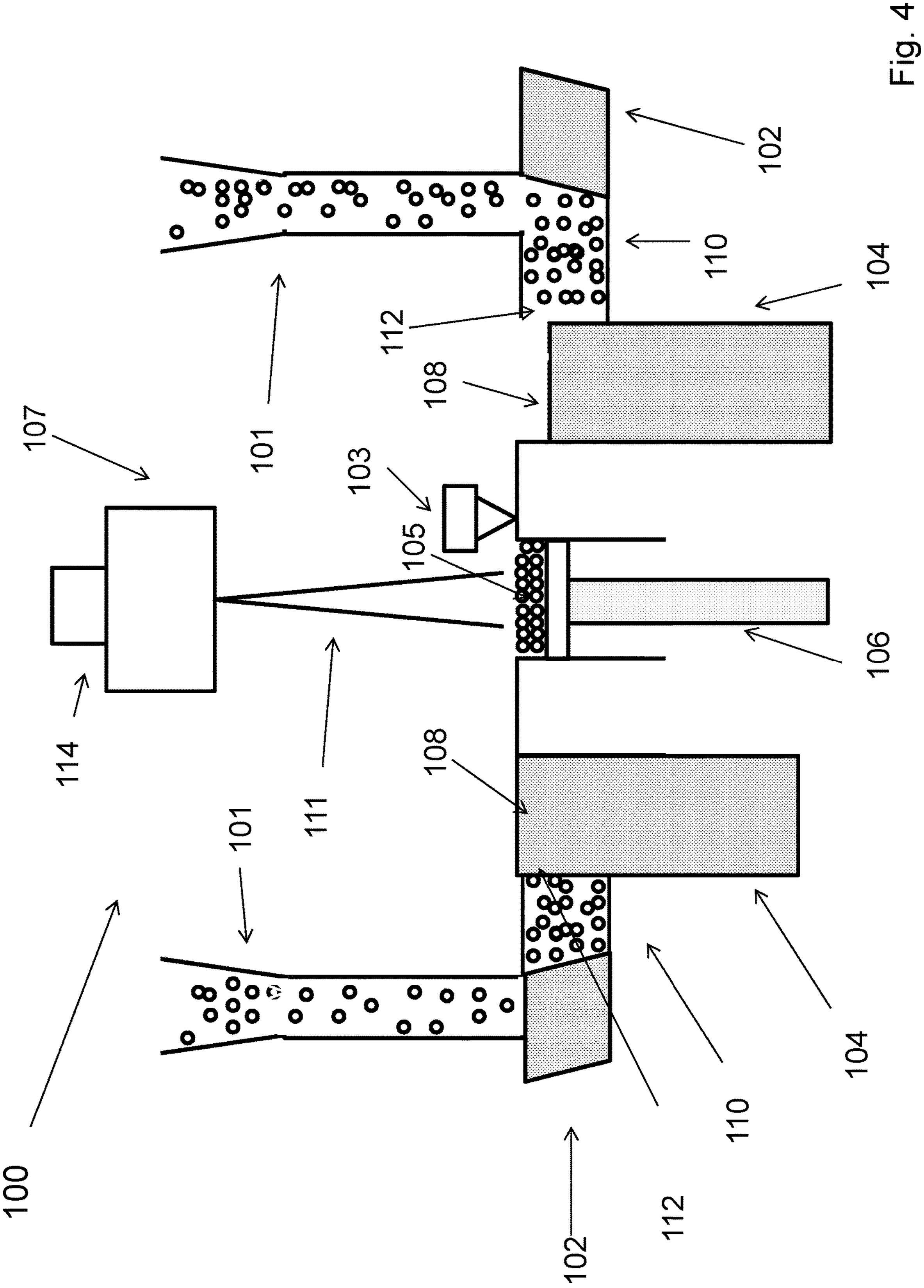
FIG. 4 shows the dust regulating device (100) during the action of the laser (114) according to the present invention.
Figure 5:
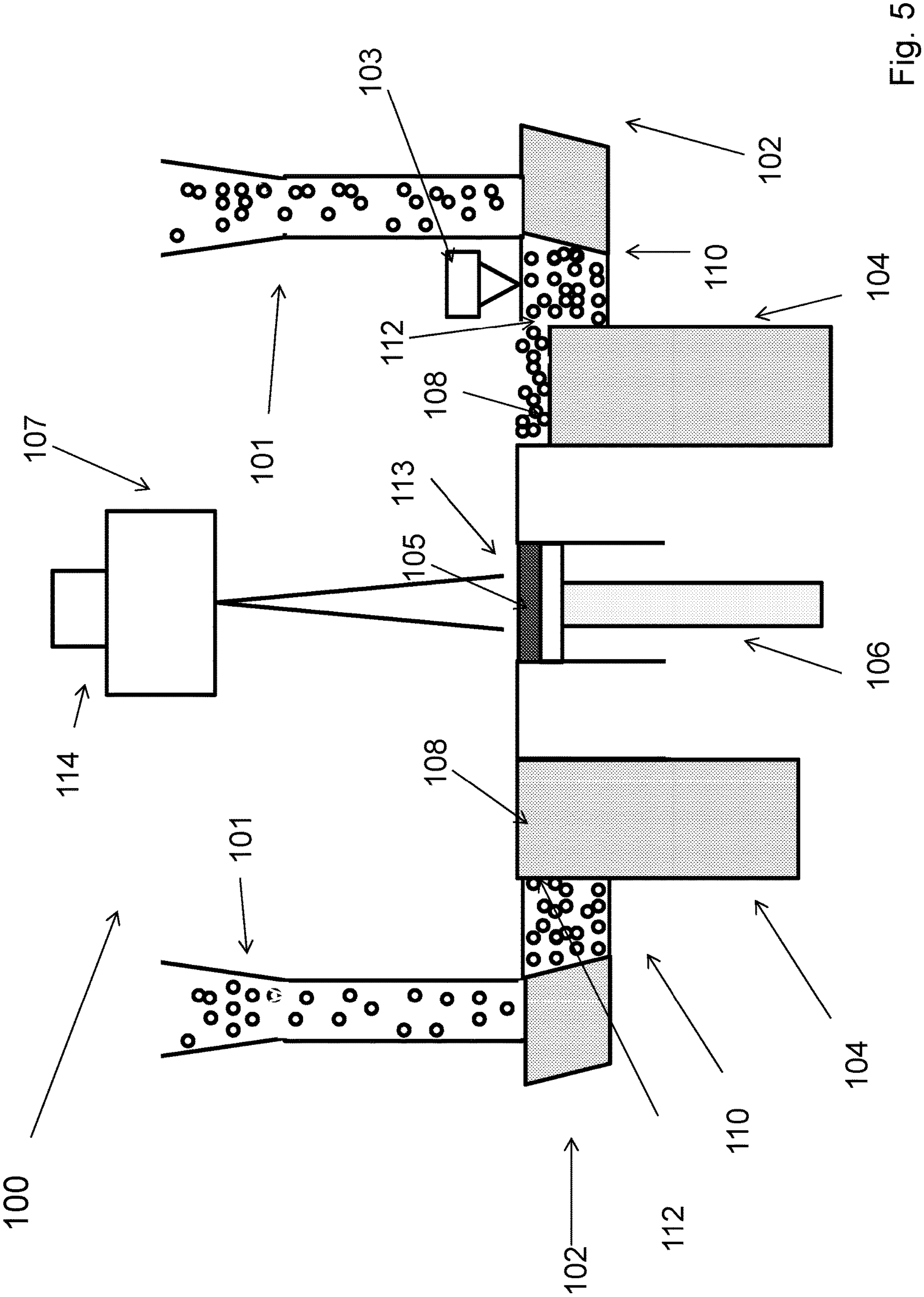
FIG. 5 shows the powder regulating device (100) with the doctor blade (103) in position near the second duct (101) and the actuation of the second piston (102) according to the present invention.
Figure 6:
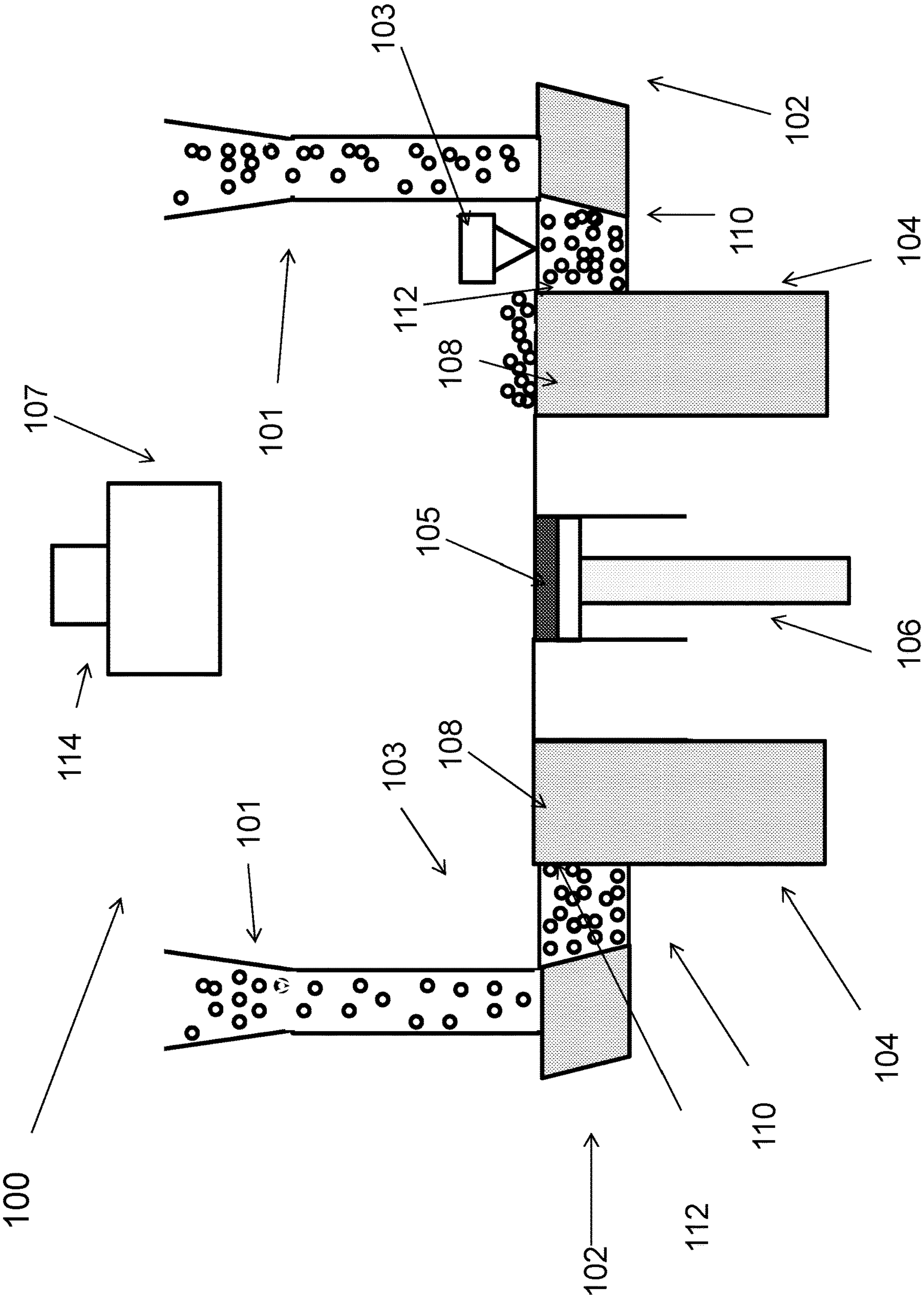
FIG. 6 shows the powder regulating device (100) with the implementation of the second piston (104) according to the present invention.
Figure 7:
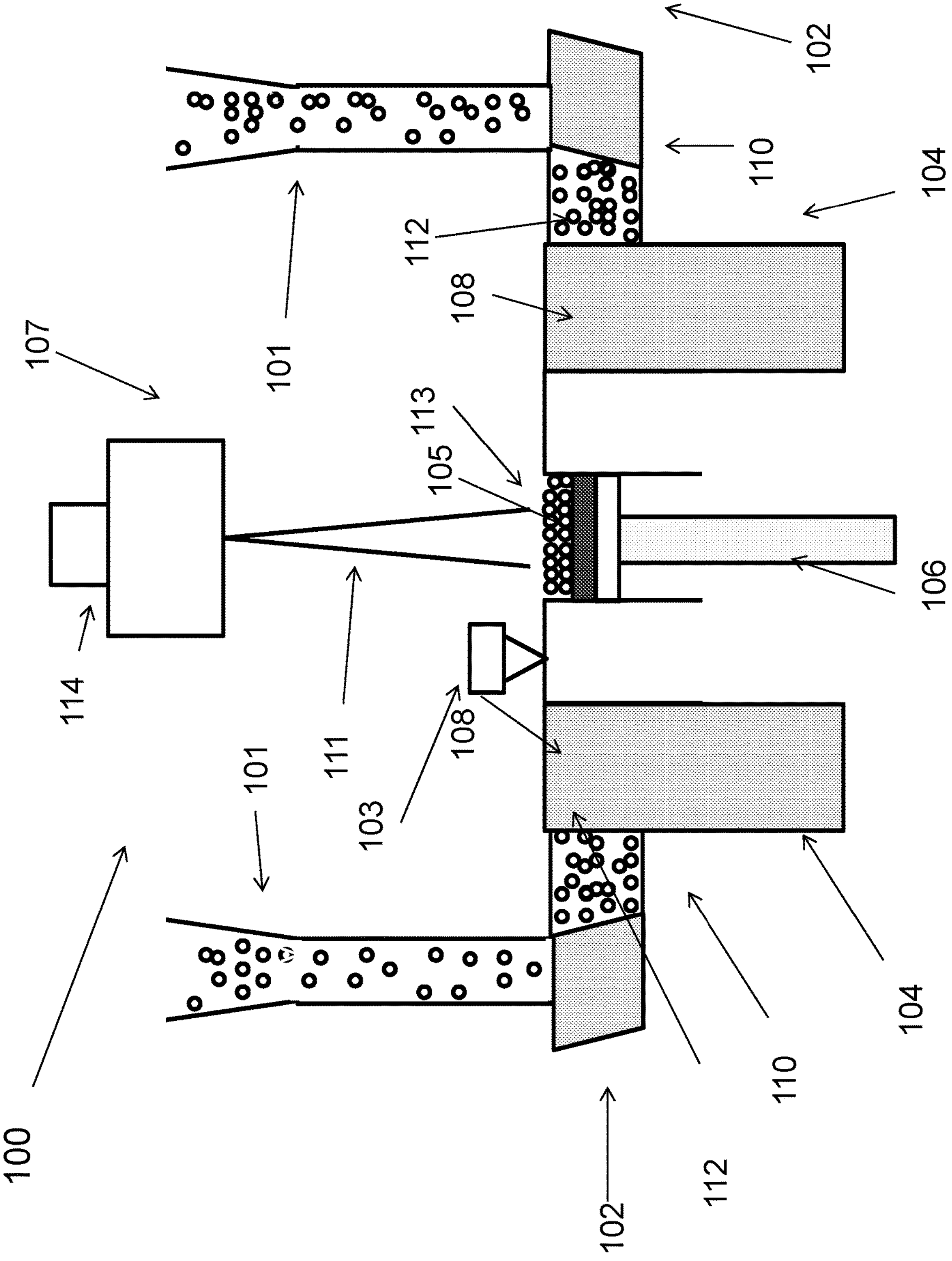
FIG. 7 shows the dust regulating device (100) during the action of the laser (114) on the next layer (113) according to the present invention.

Advantageously, the powder regulating device (100) for additive manufacturing is provided with an optical system (107) consisting of one or more fixed and/or mobile reflective and/or transmissive optical elements, necessary to modify diameter and position along the Z axis of the spot of said beam of electromagnetic radiation (111) emitted by said laser (114), and to focus said beam of electromagnetic radiation (111) emitted by said laser (114) in a predetermined area of said working plate (105), to carry out additive manufacturing processes, as shown in FIGS. 4, 5 and 7; moreover, said optical system (107) is provided with at least one laser (114), integral or non-integral with said optical system (107), connected therein, as can be seen from the various figures of the present invention.

The powder regulating device (100) for additive manufacturing is designed to concentrate the creation of three-dimensional objects using powder bed fusion technology and includes the following steps:

- a step for collecting the metal powders (109) and/or resin and/or polymeric material in said ducts (101);
- a positioning step of said metallic powders (109) and/or resin and/or polymeric material in said collection areas (108) through the mechanical action of a pair of pistons (102);
- a step for raising at the level of said doctor blade or recoater (103) of said metallic powders (109) and/or resin and/or polymeric material in said collection areas (108) by means of the vertical action of a pair of pistons (104);
- a powder spreading step, wherein a doctor blade or recoater (103) spreads a bed of metal powder (109) and/or resin and/or polymeric material on a working plate (105); and
- a laser sintering step in which a laser (114) emits a beam of electromagnetic radiation (111) in the bed of metal powder (109) and/or resin and/or polymeric material in said working plate (105) by means of the aid of a set of optical elements (107).

The invention claimed is:

1. A powder regulating device with powder distribution from above in a direction of collection areas and accurate regulation of a "dose factor" by an horizontal operation of pistons, comprising:

- two ducts designed to collect and convey particles of metal powder and/or resin and/or polymeric material in two collection areas, the ducts being connected to an upper surface of a laser operating machine with two pistons;
- a working plate, designed to house a bed of metal powder and/or resin and/or polymeric material, operatively connected to a piston;
- a doctor blade or recoater configured to spread the bed of metal powder and/or resin and/or polymeric material on the working plate;
- a first pair of pistons operatively connected to ends of the ducts, the first pair of pistons configured to introduce a predetermined quantity of the metal powder and/or resin and/or polymeric material into the collection areas;
- a second pair of pistons disposed adjacent the collection areas and operatively connected to right and left ends of a lower part of the working plate, the second pair of pistons each having a horizontal surface configured to raise a level of the metal powder and/or resin and/or polymeric material within the collection areas to a level of a doctor blade or recoater; and
- an optical system designed to convey and focus an electromagnetic radiation beam emitted by a laser source in a predetermined area of the working plate, the optical system being connected to an upper surface of a laser operating machine,
  - wherein the two ducts each have an opening, each opening faces in a direction orthogonal to the horizontal surface of each of the second pair of pistons,
  - wherein the ducts designed to collect and convey particles of metal powder and/or resin and/or polymeric material in two collection areas, are provided at a left and a right end of a shape of inverted "L" and "L" of the first pair of pistons necessary to introduce a predetermined quantity of the metal powder particles and/or resin and/or polymeric material by operating in a horizontal direction in the collection areas, ensuring a lower waste of powder and consequently a controlled recycling process, the pistons operatively connected to the ends of the ducts of a machine tool.

2. The powder regulating device according to claim 1, wherein the ducts have a vertical geometry in the shape of an "L" and inverted "L" in a vertical direction and are made of metallic material, the ducts being positioned at the ends of the working plate.

3. The powder regulating device according to claim 1, wherein the openings of the ducts are at the right and left ends of the "L" and inverted "L" inverted shape, the openings necessary to facilitate a release and positioning of the particles of metal powder and/or resin and/or polymeric material in the collection areas.

4. The powder regulating device according to claim 1, wherein the particles of metal powder and/or resin and/or polymeric material are positioned in the collection areas at a level of the doctor blade or recoater by a vertical action of the second pair of pistons operatively connected to the right and left ends of a lower part of the working plate in a machine tool.

5. The powder regulating device according to claim 4, wherein the doctor blade or recoater is designed for spreading the bed of metal powder particles and/or resin and/or polymeric material in the working plate for additive manufacturing applications, the doctor or recoater able to spread the powder bed to the left and right of the working plate, the doctor or recoater operatively connected to the working plate in a machine tool.

6. The powder regulating device according to claim 1, wherein the working plate is arranged in a predetermined position based on a quantity of particles of metal powder and/or resin material and/or polymeric material to be spread in the working plate necessary for additive manufacturing applications, the working plate operatively connected to a piston necessary to perform a vertical downward movement after solidification of a layer following an action of the laser for additive manufacturing applications.

7. The powder regulating device according to claim 1, wherein the optical system consists of one or more fixed and/or mobile reflective and/or transmissive optical elements, necessary to modify a diameter and a position along the Z axis of a spot of the beam of electromagnetic radiation emitted by the laser source and to focus the beam of electromagnetic radiation emitted by the laser source in a predetermined area of the working plate, to manufacturing processes.

8. The powder regulating device according to claim 1, wherein the optical system is provided with at least the laser source which is integral or non-integral, and connected with the optical system.

9. A method for laser sintering by an additive manufacturing process using the powder regulating device of claim 1, the method comprising:

a step for collecting the metal powders and/or resin and/or polymeric material in the ducts;

a positioning step of the metallic powders and/or resin and/or polymeric material in the collection areas by means of a mechanical action in the horizontal direction of a pair of pistons;

a step for raising at the level of the doctor blade or recoater of the metallic powders and/or resin and/or polymeric material in the collection areas by means of a vertical action of a pair of pistons;

a powder spreading step wherein a doctor blade or recoater spreads a bed of metal powder and/or resin and/or polymeric material on a working plate; and a laser sintering step wherein a laser emits a beam of electromagnetic radiation in the bed of metal powder and/or resin and/or polymeric material in the working plate by means of an aid of a set of optical elements.

* * * * *